United States Patent
Walther et al.

[15] 3,695,578
[45] Oct. 3, 1972

[54] GATE VALVE INCLUDING FLUID OPERATED LOCKING DEVICE

[72] Inventors: Ludwig Walther, Niederau; Matthias Esser, Duren; Helmut Zilken, Derichsweiler, all of Germany

[73] Assignee: Firma Zimmermann & Jansen GmbH, Duren, Germany

[22] Filed: May 19, 1970

[21] Appl. No.: 38,794

[30] Foreign Application Priority Data

May 22, 1969 Germany .........G 69 20 611.7
Dec. 11, 1969 Germany..........P 19 62 121.7

[52] U.S. Cl. ..................251/94, 251/63.4, 251/197, 251/204, 251/327
[51] Int. Cl.................................................F16k 3/14
[58] Field of Search...........251/62, 60, 94, 204, 63.4, 251/199, 167, 197

[56] References Cited

UNITED STATES PATENTS 2,793,831  5/1957  Doster......................251/197
2,802,483  8/1957  Davis......................251/94 X

FOREIGN PATENTS OR APPLICATIONS 1,150,250  6/1963  Germany...................251/197

*Primary Examiner*—Arnold Rosenthal
*Attorney*—Norman S. Blodgett

[57] ABSTRACT

This invention relates to a gate valve and, more particularly, to fluid flow control apparatus having a sliding gate operated by a hydraulic actuator and an arresting mechanism for determining the limits of gate sliding motion.

7 Claims, 6 Drawing Figures

GATE VALVE INCLUDING FLUID OPERATED LOCKING DEVICE

BACKGROUND OF THE INVENTION

In the design of gate valves, it is common practice to use an electric motor as an actuator for driving the valve through a set of step-down gears. Such a valve system is considered self-locking in that the adjustments introduced by the motor, especially the closed position, are maintained even after the electric motor has been shut off. In many cases, however, the use of an electric motor is not desirable because of the danger of explosion or because electric power is not available. The use of another power source than electricity may be desirable, particularly when a rapid operation of the gate valve is desired. In such cases, a fast-operating actuator is obtained by the admission of pressure fluid to a cylinder whose piston is connected to the gate valve by means of a shaft. In the case of gate valves in which the closure surfaces need to be pressed tightly in their closed position for optimum sealing, it has proven to be of advantage to maintain the pressure fluid continuously on the cylinder and to determine the closure forces of the gate valve in that manner. However, an important disadvantage appears, particularly if higher pressure requirements are necessary for maintaining the desired opening and closing functions. The control functions produced by gate valves have a far-reaching effect, so that the failure of the pressure fluid, particularly a drop in the pressure, brings about a drop in the gate closure forces, so that a complete and acceptable lock position is not obtained. These and other difficulties experienced with the prior art devices have been obviated in a novel manner by the present invention.

It is, therefore, an outstanding object of the invention to provide a gate valve capable of rapid operation from open to closed position.

Another object of this invention is the provision of a gate valve in which the closing pressures are maintained at all times despite changes in the pressure of the fluid operating on the actuator.

A further object of the present invention is the provision of a gate valve in which the securing forces are maintained constant and which act on the gates in locked position and keep them fixed independently of the exact position of the shaft and especially independent of further changes in force on the actuator due to failure of the feed pressure fluid or to lowered operating pressure.

With these and other objects in view, as will be apparent to those skilled in the art, the invention resides in the combination of parts set forth in the specification and covered by the claims appended hereto.

SUMMARY OF THE INVENTION

In general, the invention consists of a gate valve having a main body, having a gate mounted for sliding movement in the body, having an actuator with a shaft connected to the gate to produce the siding movement, and having an arresting device connected to the shaft to lock it when the gate is in one of its extreme positions. More specifically, an elastic intermediary element lies between the shaft and the gate to accommodate a limited relative displacement. The arresting device is operated by means of a fluid motor. The shaft is provided at one end with a lug which is located in recesses in oppositely-directed wedges having a ball-and-socket connection between them and lying between two halves of the gate.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
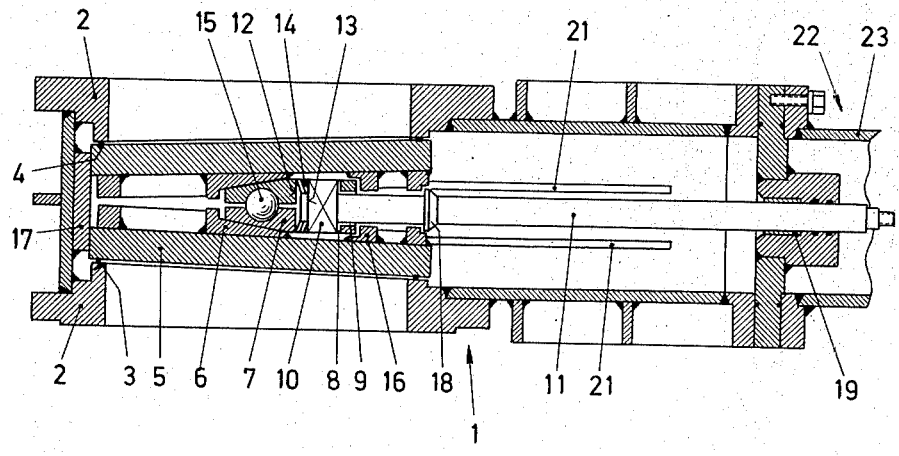
FIG. 1 is a horizontal sectional view of a portion of a gate valve embodying the principles of the present invention.

The invention is based upon gate valves of the kind described above and seeks to improve their operating behavior and maintain the securing forces constant which act on the valves in the locked position. The invention maintains them in certain tolerances independent of the exact position of the adjusting spindle or shaft and especially independent of any change in force produced by the actuating device which could be influenced by interruption of the pressure media or by lowering of the operating pressure. This is accomplished in such a way that the actuator is provided with an arresting control device at one end position of a shaft associated with the actuator. In this position is arranged a means for releasing the shaft locking control device and also an elastic intermediary member is located between the member of the actuator locked by the control device and the portion of the shaft guiding the gate into the locking position.

It has proven to be desirable to allow the control device to engage directly with recesses in the adjusting shaft or to engage its end surfaces. The arresting control device may also engage mechanical members directly or indirectly connected with the adjusting spindle or shaft and engage them behind their front faces. The adjusting spindle or shaft may be divided into two spindles which are movable relative to each other and which are connected through the elastic intermediary member, at least in one direction. It is advantageous to design the gage valve in such a way that the shaft has one lug which engages recesses in two wedges acting as adjusting members and supported relative to one another by a ball. These two wedges are located between wedge surfaces of two halves of the gate and permits a limited relative movement by displacement of the wedges to spread the gate plates. The elastic intermediary member is preferably arranged between the front surfaces of the recesses in the wedges when they are in the end positions of adjustment due to admission of the fluid to the actuator. The elastic member may incorporate Belleville springs, coiled springs, or bodies made of elastic material, such as rubber. It has been found to be advantageous to arrange the elastic intermediary member without any play and even under a pre-stress.

In some cases, in order to produce a sufficient pressure force in the gate, it is necessary to include relative movement between the adjusting spindle or shaft and the gate itself, particularly when in operating position the force of gravity does not guide the gate against its stop. In such a case, another elastic member may be added between the shaft and the gate. It does not act on the wedges. On the other hand, it is possible to arrange springs for this purpose between the front faces of the wedges in opposition to each other. It has also been found useful to provide the arresting device with an actuator operated by hydraulic fluid. An especially simple design results from shaping the free end of the piston rod as a latch. The checking control of the arresting device and also the release of control operation in dependence on the locking position would be constructed by adding to the control device a stop switch which indicates its position and provides a simple automatically secure operation.

Figure 2:
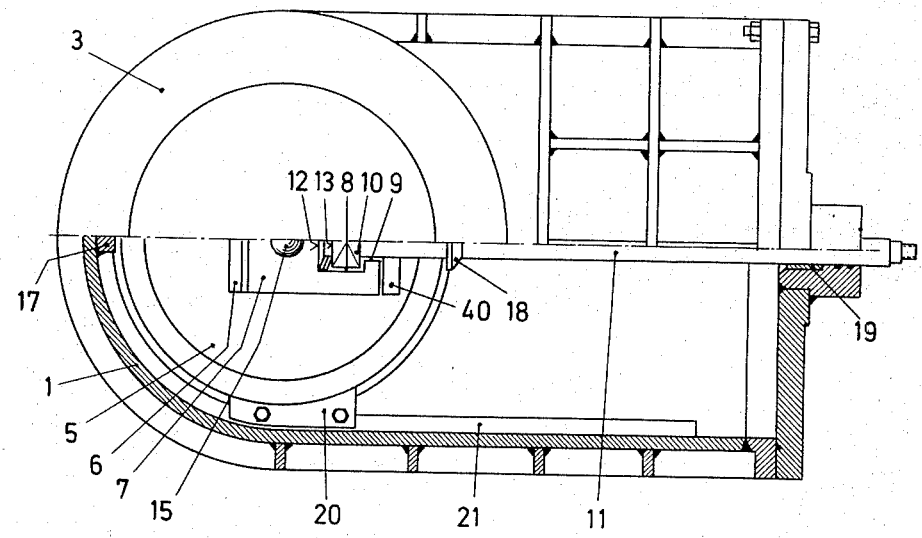
FIG. 2 is a side elevational view of the portion of the gate valve with parts broken away to show the interior.
Figure 3:
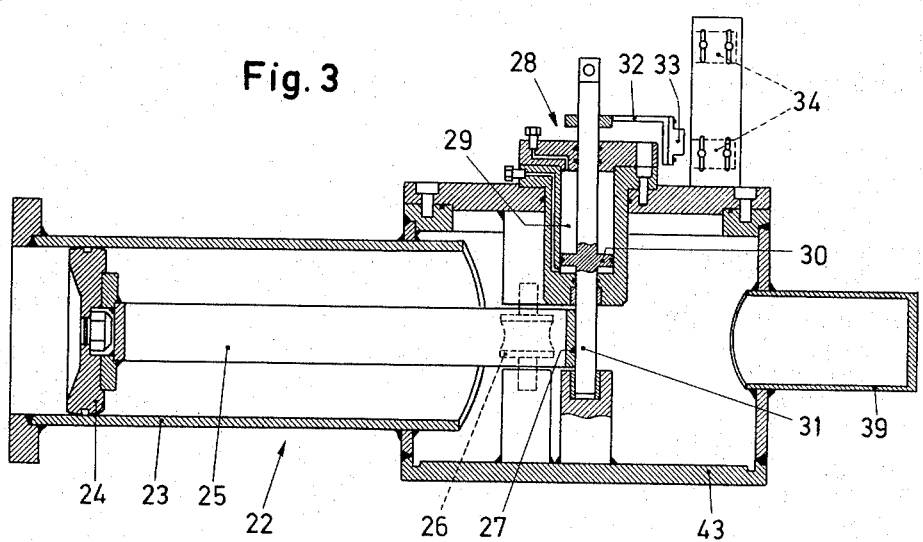
FIG. 3 is a vertical sectional view of another part of the gate valve.
Figure 4:
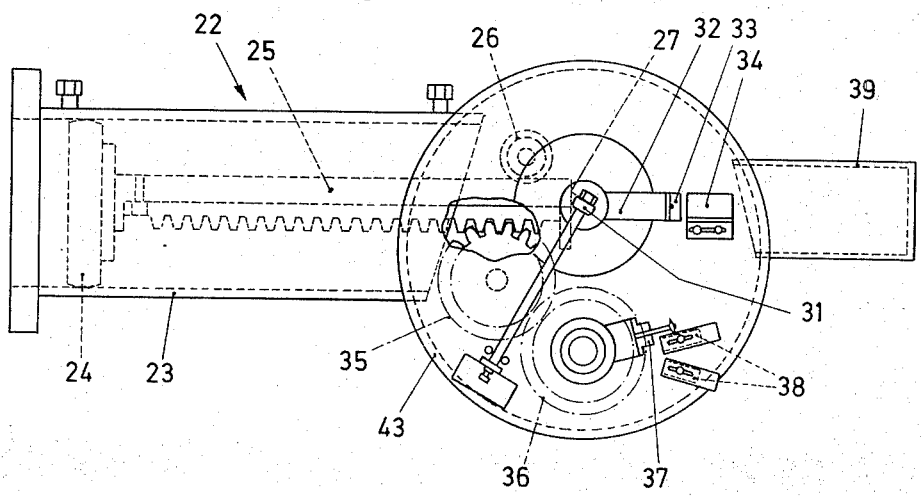
FIG. 4 is a plan view of the part of the gate valve shown in FIG. 3.

FIGS. 1 and 2 show part of the gate valve, including a housing 1 equipped with flanges 2 aligned on the same flow axis and whose facing surfaces are provided with seals 3. In the closed position of the gate valve shown in the drawings, gate plates 5 are pressed against the seal areas 3 by means of soft elastic gaskets 4. The driving means, which first pushes the gate plates forward and, after completion of the advancement, spreads them, makes use of the resilient gaskets to secure tight closure. The gate plates 5 have inside surfaces facing each other provided with wedge pieces 6 into which are inserted wedges 7 which are movable lengthwise. The wedges contain recesses 8 which have at their ends grooves 9 of semi-circular shape. In these grooves is positioned a square lug 10 formed on the adjusting spindle or shaft 11. The lug 10 is smaller than the recess 8 and between the wedge side face surfaces 12 and the face surfaces 13 of the lug is arranged a spring package 14 consisting of plate or Belleville springs which are centered by a short axial lug on the shaft and, therefore, is limited in its spring path.

The wedges 7 are movable and articulated relative to one another by means of an interposed ball 15. The extreme upper face areas of the wedges lie next to bars 16 formed on the gate plates 5, so that, during opening of the gate valve, after eliminating the spreading pressure, these face areas are able to lift the gate plates by means of the bars 16. In the position shown, the shaft 11 is brought so far down that the gate plates 5 rest on a support 17 and the bars 16 are free. For special sealing of the gate housing, the shaft is equipped with a conical collar 18 which engages (during full open position of the gate valve) with a corresponding recess in the front of a guide sleeve 19. This limits the working stroke and it also seals the housing. At the sides, the gate plates 5 are equipped with guide pieces 20 which are supported on guide bars 21 extending along the path of adjustment and which act to ensure parallel operation of the gate plates. By means of an elastic support it is possible at the start of the valve-changing movement to move the gate plates away from the soft gaskets and so prevent undesirable wear of the gasket.

The actuator 22 of the gate valve is operated by a pressure fluid such as air, a cylinder 23 is attached (as shown in FIG. 1) to the housing 1 of the gate valve and is provided with a piston 24. This piston 24 contains a device for supporting the free end valve stem or shaft 11 and is connected to a piston rod 25 which, in turn, is guided by a profile roll 26. In the position shown, the piston 24 is located in its extreme left-hand position. In this position, it is locked by an arresting device 28, so that the "closed" position of the gate valve is maintained even when the fluid pressure is interrupted. The arresting device 28 incorporates a cylinder 29 to which fluid can be admitted at either end; a piston 30 is mounted on a piston rod 31 and is movable therewith. The piston rod 31 extends from the lower end of the cylinder and is positioned in front of a face surface 27 of the piston rod 25 in such a way that the actuator prevents any backward movements even when the pressure media operating the gate valve is interrupted. The gate valve remains forced into the closed position. The lower end of the piston rod 31 is supported by a sleeve, so that the arresting device is mainly under a shear stress and, therefore, may absorb large forces.

The piston rod 25 is equipped with rack teeth which engage a pinion gear 35 which, in turn, engages a pinion gear 36. On the shafts of the pinion gears are arranged a manual auxiliary drive which may be used in the event that the pressure fluid is interrupted. To a hexagonal head of the shaft of the pinion gear 36 may be applied a correspondingly-shaped wrench. Furthermore, the shaft of the pinion gear 36 may be used for visual indication of the corresponding operating position of the gate valve and also for operating a limit switch, since the control device itself is equipped with switches indicating the corresponding conditions of the arresting device. The piston rod 31 is provided with an angular arm 32 which carries on its free end a magnet 33. This magnet acts upon a magnetic switch 34 which is located at one of the two extreme positions of the piston rod 31. Also, the shaft of the pinion gear 36 supports an angular arm with a magnet 37 which operates magnetic switches 38 in each of two end positions.

The preferred embodiment provides for locking the gate valve only in the closed position. With horizontal mounting of the gate valve a locking device for securing the open position is not required because, when the actuator pressure is terminated, no gravity forces act on the gate. Furthermore, in many cases, a securing of the open position during interruption of the pressure fluid is not required since, for safety reasons, it is often required that the gate valve is to be closed anyway. Security of the closed position by a locking device, however, is absolutely necessary, inasmuch as parts of the drive mechanism must be protected from continuous pressure forces, but also, as in the present case, a drive device may be used which does not lock automatically. In order to obtain good sealing at the closed position, even during interruption of the pressure medium, it is absolutely necessary that the wedges be always under the required spread pressure to secure the axial forces. In case the gate valve is opened from the closed position as shown, then the locking device 28 is loosened up by admitting pressure medium into the space of the cylinder 29 under the piston 30. The piston 30 is lifted upward and pulls the lower part of the piston rod 31 which serves as a locking device out of the sleeve which supports the free end. It also pulls the piston rod from contact with the face area 27 of the piston rod 25. The magnet 33 now is removed from the lower magnet switch 34 so that, for example, there may be an indication in a control room that the complete closure has been eliminated. If necessary, further switching operations may be introduced. When the upper end position is reached, the piston rod 25 is completely free and the upper magnet switch 34 has been operated to show that complete unlocking has taken place. The electrical circuits of the magnet switches 34 and 38 are, for practical purposes, part of a control or succession control circuit so that, for example, the operation of the locking device is closed until after the release of the lower switch 34. The upper switch 34 is operated and, in the frame of succession control, the pressure medium may be admitted to the end of the cylinder 23 located to the left of the piston 24 by the operation of the upper magnet switch 34.

If, during operation, the piston 24 is moved to the right-hand side, the piston rod 25 crosses the path of the piston rod 31 and the free end enters the cylinder 39. The adjusting spindle or shaft 11 of FIGS. 1 and 2 are connected with the piston and they are also carried to the right-hand side. Then, in this operation, the spring package 14, which is arranged between the facing surfaces 12 and 13, will be relieved and, as soon as the upper face area of the lug 10 reaches the recess 8, the wedges 7 will be pulled out of the wedge pieces 6 of the gate halves. In this manner, the width of support for the gate plates is reduced and, under the influence of the pressure of the fluid pressure and, in some cases, by springs, it is possible to lift the gate plate vertically from the sealing areas 3 so that the release of the soft gaskets 4 is brought about extremely carefully. The loosening of the wedges in this way permits the selection of a relatively steep slope which would otherwise exclude self-locking of the wedges.

As the movement to the right continues, the upper limiting area of the wedges 7 pushes against the bars 16 of the gate plates 5 so that, after completion of the lift-off phase, the displacement of the gate starts. The gate plates are lifted from the support plates 17 and pulled up to the end or open position as defined and limited by the contact of the collar 18 with the guide 19. In this manner, the gate is free of the flow area through the flanges 2 of the valve. In special cases where locking is required in the "open" position, the piston rod 25 can be equipped with a recess which permits the introduction of the piston rod 31 of the arresting device in this position also.

Figure 5:
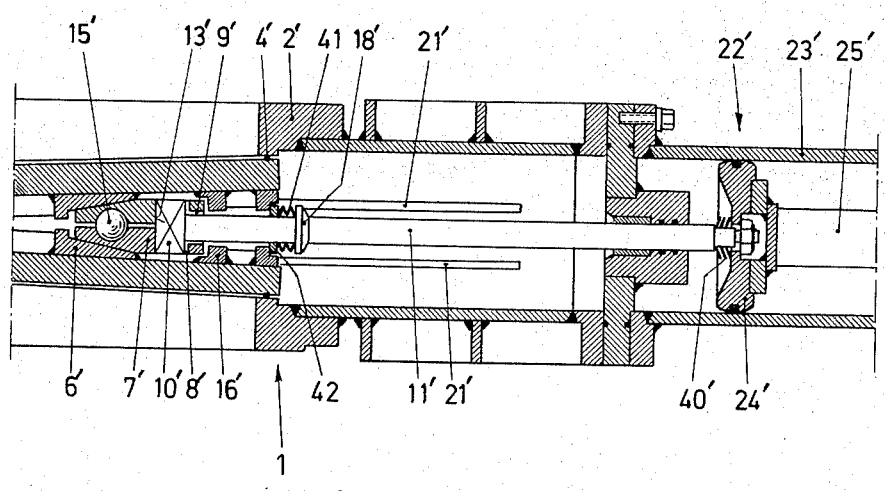
FIG. 5 is a vertical sectional view of a portion of a gate valve incorporating a modified form of the invention.
Figure 6:
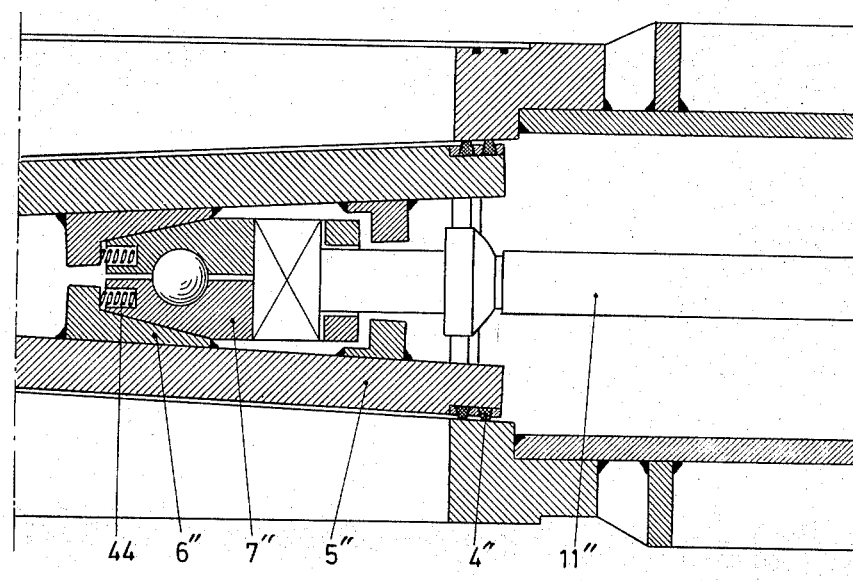
FIG. 6 is a vertical sectional view of a further modification of the invention.

During the closing operation of the gate valve, the portion of the cylinder 23 located at the right-hand of the piston 24 receives the pressure fluid. In the preferred embodiment, this space includes the housing 43 incorporating the pinion gears 35 and 36 as well as the cylinder 29 which, at the same time, is placed under pressure. In the first part of the movement, which extends through the largest part of the stroke, the gate plates 5 are pushed in front of the flanges 2 along the guide tracks 21 until the ends press against the support 17 and so a further advance is prevented. This lowering of the gate plates may be done in a vertical gate valve mainly by the weight of the gate plates themselves. The movement into the end position may also be brought about by springs 41 or 44, as shown in FIGS. 5 and 6, respectively, which, during closing of the gate valve, guide the gate plates safely into the end position. During the opening operation, the springs support the action of the forces which pull the wedges out of the wedge areas of the gate plates so that its seals are not pressed any more against the seal seats.

As soon as the gate plates 5 press against the support 17, the wedges 7 are pressed into the wedge pieces 6 of the gate plates and start to spread them during further advance of the shaft 11 through the spring package 14. As soon as the spreading force overcomes the forces acting on the gate plates for instance, gravity forces — the pressure of the locking fluid and the force of the spring supporting the gate plate against the guide tracks 21, the gate plates 5 are moved vertically toward the seal areas 3 on the flanges 2. The elastic intermediary element in the form of the spring package 14 then will permit the installation of the arresting device 28. The actuator is able to push the shaft into the extreme position, so that the piston rod 31 serving as an arrestor will be moved freely into the arresting position behind the supporting face area 27. In the event that the actuator is relieved or the feeding fluid is interrupted, then the piston rod 25 as well as the spindle 22 are able to yield until the face 27 rests on the piston rod 31 is safely supported. The small distance covered during the opening operation of the gate valve (which depends on the state of wear and so forth) can be taken up by the spring package 14 without the initial tensing force for the wedges being greatly reduced. In the preferred embodiment, the elastic force is only necessary in one direction and, in the other direction the possible displacement is limited by a fixed stop, since the arresting is made only in one of the end positions. Basically, nothing is changed is in this design even if an arresting in the other of the two extreme positions should be activated when the gate valve is open. In this position, it is essential that the gate plates be pulled out of the free entrance cross-section of the valve housing and an exact position in general need not be maintained. In the case of this second extreme position, or in case there is requirement for some other exactly defined position, then there must be added in the counter-direction a second elastic intermediary member which may be stressed from both sides as, for example, a clamped spring or the like. It is not a requirement to install the spring on a certain spot within the whole system; it is satisfactory if the spring permits by its initail stress a relative displacement between the drive member to be locked and the adjusting member affecting the spreading of the wedges.

FIGS. 5 and 6 show variations of the gate valve, particularly the important parts affecting the drive of the gate plates of a gate valve with an actuator. In connection with these versions of the invention there is shown a second elastic member which, most particularly in the case of horizontally-mounted gate valves, secures the advance of the gate plates and, in the last phase of closing, affects the spreading adjustment by permitting sufficient play. The elastic intermediary member is arranged in series with a spring and, in order to achieve satisfactory adjusting movement, it is designed considerably harder than the second spring package. There is also the possibility of arranging both spring sets in parallel to each other. The elastic intermediary element would, in this case, be arranged on the same spot as shown in FIG. 1 and 2.

The main differences shown in FIG. 5 in comparison with the version shown in FIGS. 1 and 2 are to be seen in the fact that the shaft 11' is not fixedly connected with the piston 24' but is elastically connected. The shaft is recessed in front of the piston 24' and between the collar areas so formed and the facing area of the piston 24' is provided a spring package 40' which, in the preferred embodiment, is shown as a stack of Belleville springs. The nut on the end of the shaft is secured and the connection between the piston 24' and the piston rod 25' is chosen in such a way that the free end of the adjusting spindle or shaft 11' is capable of sufficient axial play. In this way, the desired elastic connection is provided, thus limiting the adjusting force and maintaining it constant, even when the real adjusting path changes through wear, or the driving device during relief yields and supports itself against the locking device.

A considerably softer spring package 41' is arranged underneath the collar 18' of the shaft 11' and serves other purposes also. It places the gate plates in tension through the bridge 42' and, even with horizontal mounting of the gate valve, is able to push them against the stop. If the gate plates have reached the extreme position in their lengthwise displacement, then the shaft 11', by pressing the spring package 41' together, can be pushed forwardly for spreading of the gate plates by placing the spring package 40' under stress, so that the gate plates take part in the lengthwise movement. It has been proved to be even more important that, during the lifting of the shaft 11' during opening of the gate valve, the shaft itself is lifted first together with the wedges 7' and the spring package 41' through the bridge 42' maintaining the gate plates still under certain limits in their end positions.

The same thing may be achieved in the manner shown in FIG. 6 by providing the wedges with springs 44' which extend from the face areas of the wedges and support themselves against wedge pieces 6''. The spring package is supported by a spring package or springs and not only protects the soft gasket 4'' form overloads, as for example during acceleration, but also intercepts masses from the accumulator at peak force. The elastic intermediary member designed in the spring package permits the displacement of the piston rod 25'' into the end position defined by the arresting device independently of the of the state of wear of the soft gaskets of the wedge areas and other elements which appear independent of deviations of the relative positions of the parts within the system. The elastic intermediary member receives with only small tolerances scattered spring forces and consequent spreading forces of the gate plates. It is possible in connection with such an elastic intermediary member to secure an absolute closure in the locked position, which closure is not influenced by wear nor by interruption of the pressure medium, since the locking device limits the backward movement of the actuator to a small amount. This amount is predetermined at the extreme position of the shaft when subjected to deviation with a fluid-operated device always determining the locking position.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A gate valve comprising:
   a. a main body,
   b. a gate mounted for sliding movement in the body,
   c. an actuator having a shaft connected to the gate to produce the sliding movement, the shaft being provided at one end with a lug which is located in facing recesses in oppositely-directed wedges having a ball-and-socket connection between them and lying between two halves of the gate, the shaft being formed with a rack which engages a gear for the rotation thereof,
   d. an arresting device engaging a transverse surface on the shaft to lock it when the gate is in one of its extreme positions, the gear operating electrical switches for controlling the arresting device to lock and unlock the valve, and
   e. an elastic intermediary element located between the arrest-device and the gate to accommodate a limited relative displacement.

2. A gate valve as recited in claim 1, wherein the arresting device is operated by means of a fluid motor.

3. A gate valve as recited in claim 1, wherein the shaft is divided into two parts which are displaceable relative to each other with the elastic intermediary element located between them.

4. A gate valve as recited in claim 1, wherein the elastic element lies between the lug on the shaft and surfaces of the wedges.

5. A gate valve as recited in claim 4, wherein the elastic intermediary element is made up of disc springs.

6. A gate valve as recited in claim 1, wherein the elastic intermediary element is installed under an initial tension.

7. A gate valve as recited in claim 1, wherein the arresting device is provided with switches for showing the position of the arresting device.

* * * * *